S. Mendenhall.
Harrow.
No. 88,195. Patented Mar. 23, 1869.
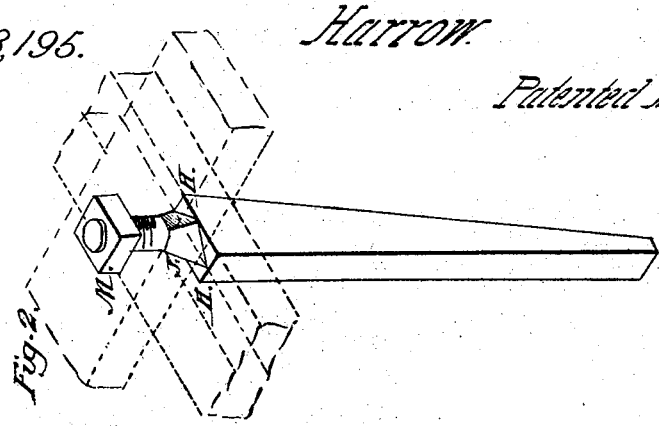
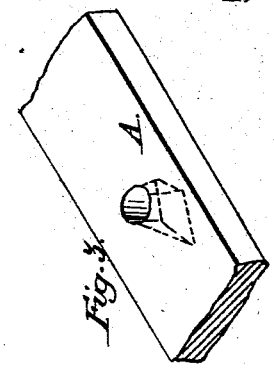
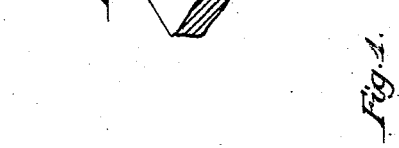
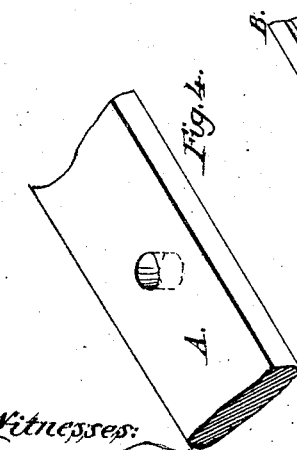
Witnesses:
Edk. W. Farley
G. Mattys
Inventor:
Samuel Mendenhall
By his Atty
J. J. Reigart

SAMUEL MENDENHALL, OF MUNCY STATION, PENNSYLVANIA.

Letters Patent No. 88,195, dated March 23, 1869.

IMPROVEMENT IN HARROWS.

The Schedule referred to in these Letters Patent and making part of the same.

*To all whom it may concern:*

Be it known that I, SAMUEL MENDENHALL, of Muncy Station, Lycoming county, State of Pennsylvania, have invented "Improvements in Harrows;" and I do hereby declare the following to be an exact description thereof, reference being had to the accompanying drawings, and to the letters of reference marked thereon, making a part of this specification, in which—

Figure 1 represents a perspective view of the harrow.

Figure 2, a perspective view of a tooth, showing how it is fitted into the cross-bars.

Figure 3 shows the diamond-shape aperture in the lower bar that fits on to the shoulder of the tooth.

Figure 4 shows the round aperture in the upper bar that fits the head of the tooth that is fastened by the nut at top.

The nature of my invention consists in the construction of the double-barred iron harrow, with oblique ends and elevated hooks, or stiff coupling, and in the combination of the same with teeth, constructed with diamond-shaped shoulders, corresponding with the cross-bearings, or bars composing the frame of the harrow.

A represents the cross-bars composing the iron frame of the harrow, the rear arms B B being bars set at angles oblique to the front frame.

C C, the draught-chains and double-tree to which the horses are hitched.

D is the stiff coupling that connects the two divisions of the harrow together, formed by two uprights, with a cross-link at top, and elevated for the purpose of preventing stubble or stumps from clogging up or interfering with the progress of the harrow.

This stiff coupling D also keeps the two divisions, or sections of the harrow at equal distances apart.

The iron harrow is constructed with three spaces in front and two behind the bend, which cause the teeth E E to cut the front spaces of the ground left between the front teeth G G.

The teeth E and G are square, tapering to a point below, and having shoulders H at top, with diamond-shaped necks, J, to fit the bars at top, and a round head, L, and screw, to fit the upper bar and nut M, to fasten and strengthen the teeth, and give strength to the harrow-frame.

The top braces N also strengthen the harrow, and prevent it from racking.

What I claim as my invention, and desire to secure by Letters Patent, is—

The construction of the double-barred iron harrow with oblique ends, B, and elevated coupling D, when arranged and combined with teeth having diamond-shaped necks J and shoulders H, as herein described, and for the purpose set forth.

SAMUEL MENDENHALL.

Witnesses:
E. D. MAYHEW,
EDM. F. BROWN.